United States Patent [19]

Galarza et al.

[11] Patent Number: 5,054,413

[45] Date of Patent: Oct. 8, 1991

[54] SAILBOAT PENNANT MOUNTING UNIT

[75] Inventors: James Galarza, 110-11 Queens Blvd., Forest Hills, N.Y. 11375; Henry F. Skoczylas, Colonia, N.J.

[73] Assignee: James Galarza, Forest Hills, N.Y.

[21] Appl. No.: 621,578

[22] Filed: Dec. 3, 1990

[51] Int. Cl.$^5$ .............................................. B63H 9/04
[52] U.S. Cl. .................................... 114/102; 116/25; 116/200
[58] Field of Search ............... 114/102, 103, 104, 105, 114/106, 107, 108, 109, 110, 111, 112, 113, 114, 115; 116/26, 200, 265; 73/188

[56] References Cited

U.S. PATENT DOCUMENTS

| 3,318,277 | 5/1967 | Palm | 114/102 |
| 3,930,290 | 1/1976 | Mangels | 114/108 |
| 4,402,220 | 9/1983 | Kuhlmann et al. | 114/102 |
| 4,437,425 | 3/1984 | Unden | 114/102 |

Primary Examiner—Sherman Basinger
Assistant Examiner—Stephen P. Avila
Attorney, Agent, or Firm—Samuelson & Jacob

[57] ABSTRACT

A pennant mounting unit enables the mounting of a relatively large pennant upon the stay of a sailboat for free swinging movement relative to the stay about an altitudinal axis passing through an elevated fixed altitudinal position on the stay, independent of the angle of inclination of the stay, without hindering the normal operation of the sailboat.

14 Claims, 3 Drawing Sheets

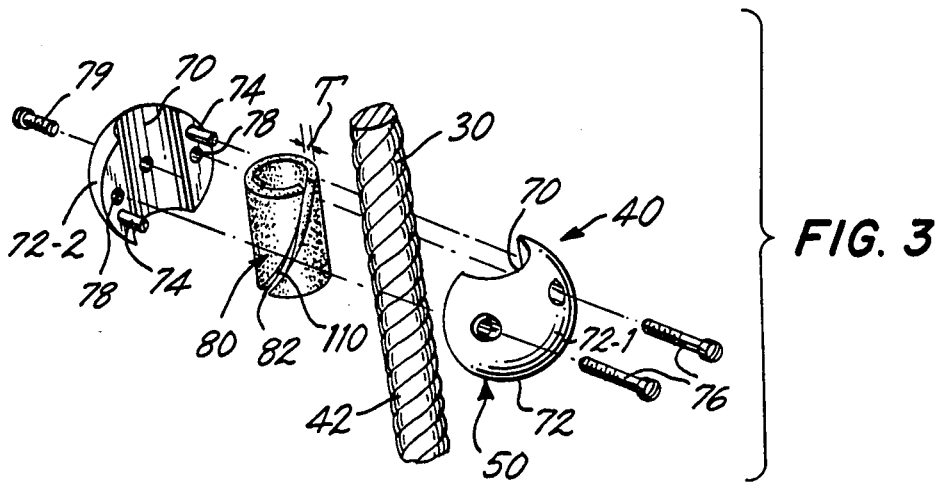
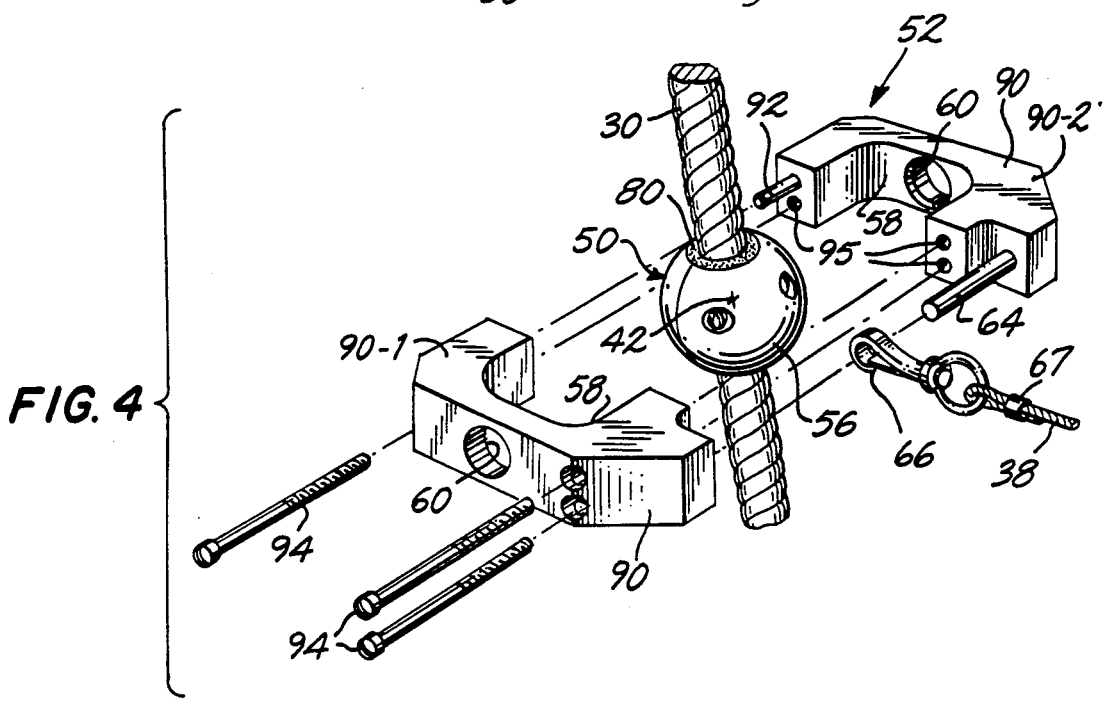
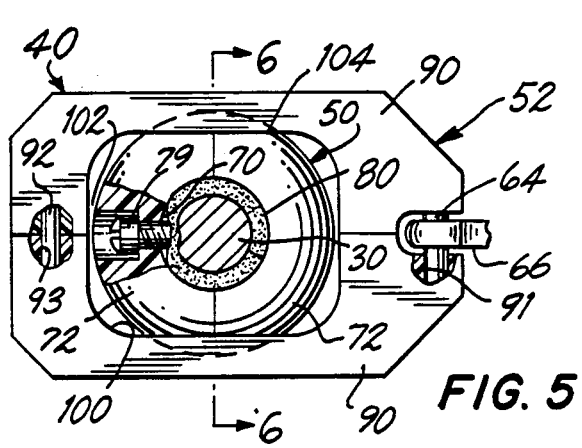
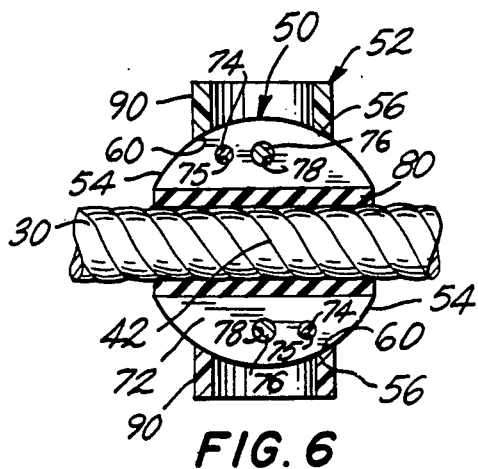

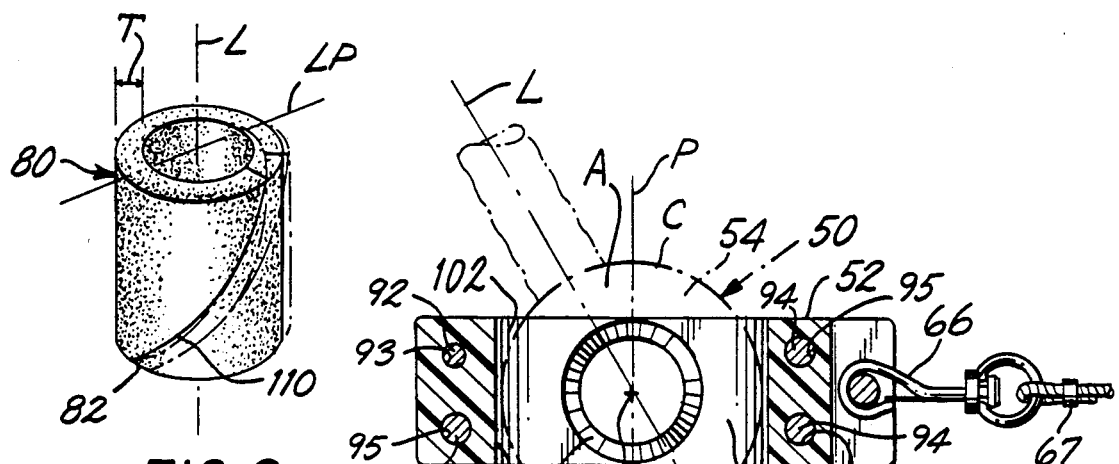
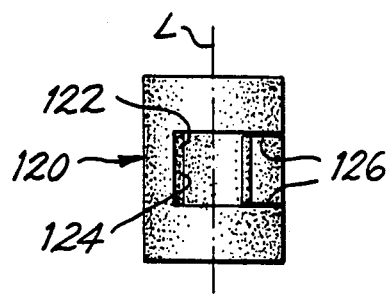
FIG. 11
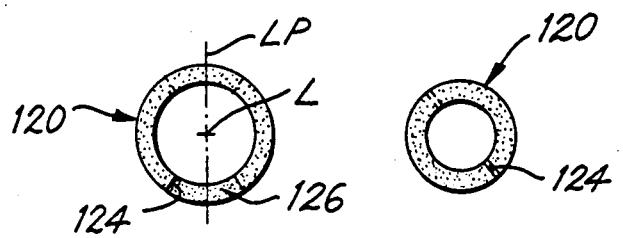
FIG. 9    FIG. 12
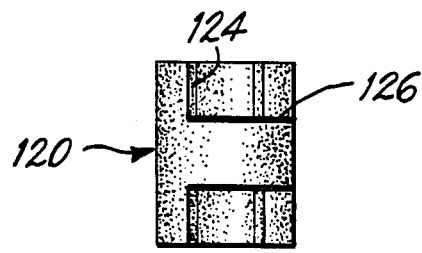
FIG. 10

SAILBOAT PENNANT MOUNTING UNIT

The present invention relates generally to the mounting of flags and pennants on sailboats and pertains, more specifically, to a mounting unit suitable for mounting a relatively large pennant to a stay of a sailboat for appropriate free swinging movement relative to the stay.

An increased popularity in sailing over recent years has created a demand for more and varied articles and apparatus used in connection with sailing. One attractive addition to almost any sailboat is a relatively large flag or pennant flown from a stay of the sailboat. While such pennants have been put into use by some sailing enthusiasts, more widespread use has been hindered by difficulties encountered in mounting a large pennant to an appropriate stay in a manner which will assure secure affixation to the stay while enabling appropriate free swinging movement of the pennant relative to the stay without interfering with the normal operation of the sailboat.

The present invention provides a mounting unit which facilitates the mounting of a relatively large pennant upon a stay of a sailboat so that the pennant may be flown without affecting the normal operation of the sailboat and, as such, attains several objects and advantages, some of which are summarized as follows: Permits the mounting of a relatively large pennant upon a selected stay of a sailboat for appropriate free swinging movement of the pennant relative to the stay; accommodates a stay which extends at any one of a range of angles of inclination found in the stays of a wide variety of sailboats and automatically compensates for the particular angle of inclination of the stay upon which a pennant is mounted; is adaptable readily to any one of a plurality of stay sizes encountered in a wide variety of sailboats; enables ease of installation upon a selected stay without requiring special skills or special tools, and without requiring dismantling any connection between the stay and the sailboat; employs a simplified construction for economy of manufacture, ease of installation and minimal maintenance; provides a pennant mount of high strength and durability, suitable for use in connection with a relatively large pennant under virtually all conditions encountered during use; and employs a rugged construction, resistant to the various elements encountered in marine use, for exemplary performance over a long service life.

The above objects and advantages, as well as further objects and advantages are attained by the present invention, which may be described briefly as a pennant mounting unit for mounting a pennant to a stay of a sailboat for free swinging movement relative to the stay about an altitudinal axis passing through an elevated fixed altitudinal position on the stay, the stay extending along a longitudinal axis, the mounting unit comprising: a bearing member having a longitudinal internal passage and an external surface including a first bearing surface portion following a generally spherical contour of predetermined extent, the bearing member being split longitudinally for reception of the stay in the internal passage by movement laterally into the internal passage such that the stay may be placed longitudinally coextensive with the internal passage at the fixed altitudinal position; securing means for securing the bearing member at the elevated fixed altitudinal position on the stay; a cage member having an internal surface including a second bearing surface portion generally complementary to the first bearing surface portion along the spherical contour for bearing engagement between the complementary first and second bearing surface portions, the cage member being split longitudinally for placement laterally over the stay and the bearing member, with the first and second bearing surface portions engaged in said bearing engagement for swinging movement of the cage member relative to the bearing member, when the bearing member is secured to the stay; and attachment means for attaching the pennant to the cage member; the second bearing surface portion being truncated relative to the predetermined extent of the spherical contour of the first bearing surface portion for enabling orientation of the longitudinal axis, and the stay, at an angle to the altitudinal axis while permitting free swinging movement of the cage member, and the pennant attached thereto, about the altitudinal axis, relative to the stay.

The invention will be understood more fully, while still further objects and advantages will become apparent, in the following detailed description of preferred embodiments of the invention illustrated in the accompanying drawing, in which:

FIG. 3 is an exploded perspective view of a portion of the mounting unit being mounted on the stay;

FIG. 4 is an exploded perspective view showing a further portion of the mounting unit being assembled in place;

FIG. 5 is a top plan view of the mounting unit mounted on the stay;

FIG. 6 is a cross-sectional view taken along line 6—6 of FIG. 5;

FIG. 7 is a somewhat diagrammatic illustration of the portion shown in FIG. 1, demonstrating operation of the mounting unit;

FIG. 8 is a perspective view of a component part of the mounting unit;

FIG. 9 is a top plan view of an alternate construction for a component part of the mounting unit;

FIG. 10 is a front elevational view of the component part of FIG. 9;

FIG. 11 is a rear elevational view of the component part of FIG. 9; and

FIG. 12 is a top plan view of the component part of FIG. 9 in an alternate operating configuration.

Figure 1:
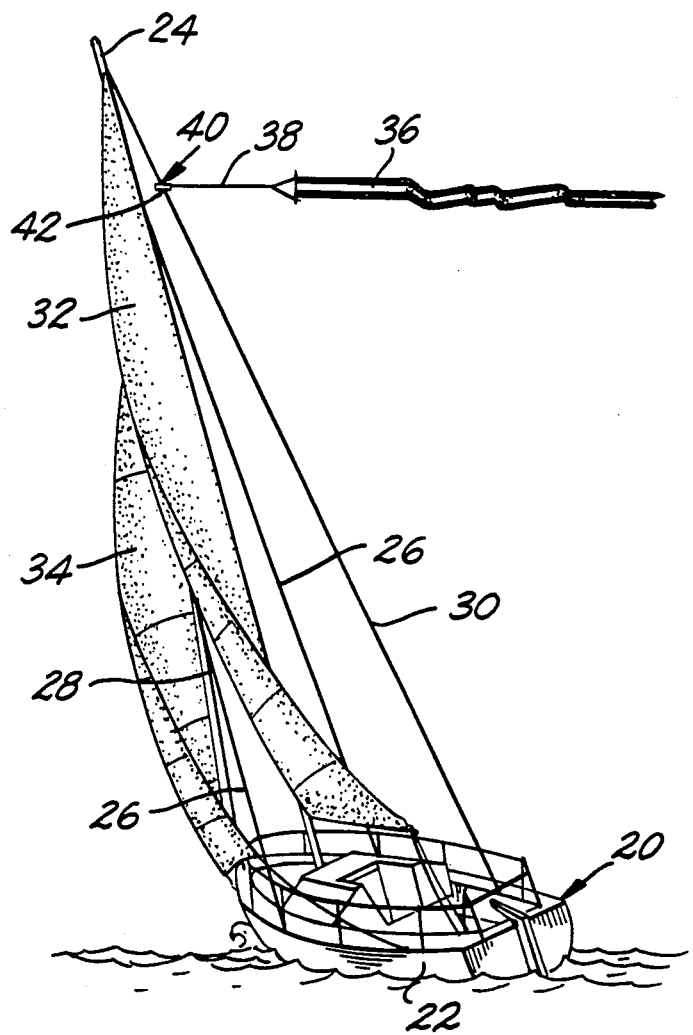
FIG. 1 is a pictorial view of a sailboat flying a relatively large pennant from a stay thereof, the pennant being mounted on the stay with a mounting unit of the present invention.

Referring now to the drawing and especially to FIG. 1 thereof, a sailboat 20 is seen underway and includes a hull 22 and a mast 24. Mast 24 extends altitudinally relative to hull 22 and is stabilized with respect to the hull 22 by means of a plurality of stays, including side stays 26, a forward stay 28 and an aft or back stay 30. All of the stays 26, 28 and 30 are constructed of wire cable and extend between the hull 22 and the upper reaches of the mast 24 to steady the mast 24 against the forces exerted by operation of the sails 32 and 34 of the sailboat 20. A relatively large pennant 36 is seen flying from the back stay 30, the pennant 36 being attached to a line 38 which, in turn, is secured to a mounting unit 40 constructed in accordance with the present invention and affixed to the back stay 30 at an elevated fixed altitudinal position 42. Thus, pennant 36 provides an aesthetically pleasing addition to sailboat 20, especially when the sailboat 20 is underway, as depicted in FIG. 1.

Figure 2:
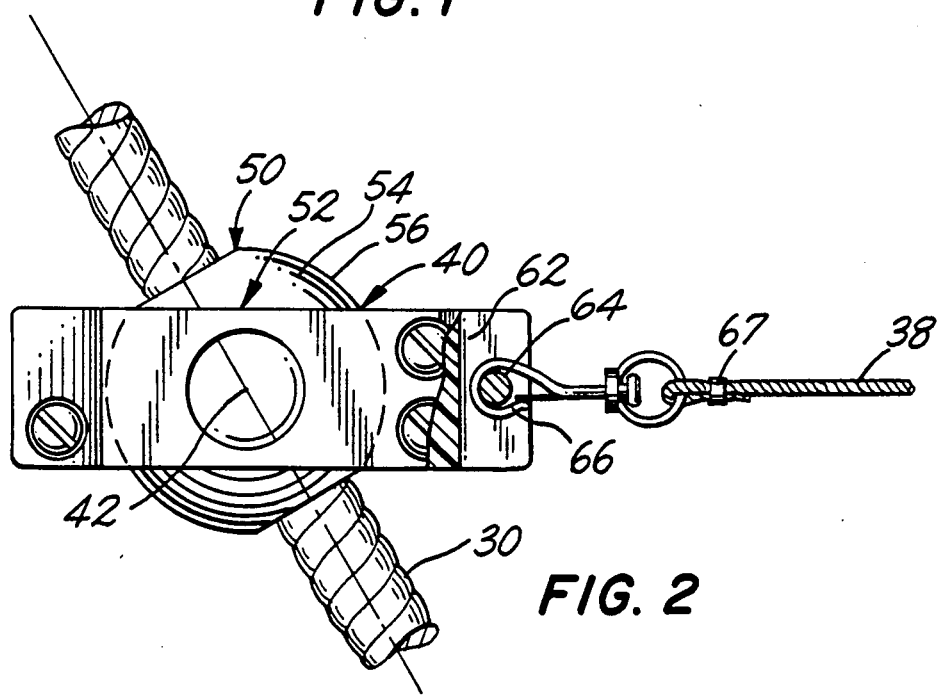
FIG. 2 is an enlarged fragmentary elevational view of a portion of FIG. 1 showing the mounting unit on the stay.

Mounting unit 40 enables pennant 36 to swing freely relative to stay 30, without hindering the normal operation of the sailboat 20. As best seen in FIG. 2, mounting unit 40 includes a bearing member 50 secured to the stay 30 and a cage member 52 placed over the bearing member 50. The bearing member 50 has an external surface 54 including a first bearing surface portion 56 following a generally spherical contour of predetermined diameter and extent, and the cage member 52 has an internal surface 58 (see FIGS. 4 and 6) including a second bearing surface portion 60 generally complementary to the first bearing surface portion 56 along the spherical contour so as to establish a bearing engagement between the complementary first and second bearing surface portions 56 and 60. The cage member 52 includes a slot 62 and a pin 64 extends across the slot 62 and passes through a swivel-snap 66 to capture the swivel-snap 66 on the pin 64 and in the cage member 52. Line 38 is affixed to swivel-snap 66 by means of a ferrule 67 so that line 38 and swivel-snap 66 serve as attachment means by which the pennant 36 is attached to the cage member 52 so as to swing with the cage member 52 about the bearing member 50.

Turning now to FIG. 3, bearing member 50 includes an internal passage 70 extending longitudinally through the bearing member 50 and having a lateral diameter at least complementary to and preferably greater than the diameter of the stay 30 to which the bearing member 50 is to be affixed. Bearing member 50 is split longitudinally, preferably into two individual half-members 72, each of which half-members 72 has a generally hemispherical configuration, so that the stay 30 may be moved laterally into the internal passage 70 by placing the bearing member 50 laterally over the stay 30 at the selected elevated position 42 and then securing the bearing member to the stay 30, without dismantling the stay 30 from the hull 22 of the sailboat 20. Thus, the half-members 72 are placed over the stay 30, are brought into alignment by alignment pins 74 which enter complementary holes 75 (see FIG. 6) and are then secured together by securing means in the form of threaded fasteners 76 which pass through one of the half-members 72-1 and thread into the other of the half-members 72-2, at 78, while the alignment pins 74 maintain the half-members 72 in alignment, until the fully assembled generally spherical bearing member 50 is clamped onto the stay 30 at the elevated altitudinal position 42. A set screw 79 is threaded through half-member 72-2 and supplements the clamping action to assure that the bearing member 50 remains secured to the stay 30 at the elevated altitudinal position 42 (see FIG. 6).

It is noted that stay 30 has a predetermined diameter, which predetermined diameter may vary from one sailboat to another. In order to assure that mounting unit 40 is adapted for installation upon a wide variety of sailboats having a range of stay diameters, the securing means includes a sleeve 80 constructed of a resilient material, such as an elastomer, to be interposed between the stay 30 and the bearing member 50. Sleeve 80 has a wall thickness T no less than one-half the difference between the predetermined diameter of the stay 30 and the lateral diameter of the passage 70 so that upon clamping the half-members 72 onto the stay 30, with the sleeve 80 interposed between the stay 30 and the bearing member 50, as described above, the sleeve 80 will be compressed between the stay 30 and the passage 70 to assure a firm grip on the stay 30, regardless of the diameter of the particular stay upon which the bearing member 50 is secured. Sleeve 80 is split at 82 to enable placement of the sleeve 80 laterally over the stay 30 while the stay 30 remains in place on the sailboat 20.

Referring now to FIG. 4, once the bearing member 50 is in place on the stay 30, at the selected elevated altitudinal position 42, the cage member 52 is placed laterally over the bearing member 50, and the stay 30, for bearing engagement of the complementary bearing surface portions 56 and 60. To this end, cage member 52 is split, preferably into two individual half-members 90, each of which half-members 90 has a generally C-shaped configuration, and is assembled over the previously-assembled generally spherical bearing member 50. The half-members 90 are aligned by pin 64, which enters a complementary hole 91 (see FIG. 3), and a further alignment pin 92, which enters complementary hole 93, and then held in that alignment while being fastened together by means of threaded fasteners 94 which pass through one half-member 90-1 and are threaded into the other half-member 90-2 at 95. Swivel-snap 66 then may be snapped over pin 64 so that the swivel-snap 66 is captured on the pin 64, within the slot 62, and the pennant 36 is secured to the mounting unit 40. It is noted that the fixed altitudinal position 42 is placed high enough so that when the pennant 36 is secured to the mounting unit 40 and is dormant, the pennant 36 will hang down, but will be elevated above the hull 22 of sailboat 20 a distance sufficient to assure that the normal activities of the crew and other persons in and about the sailboat 20 will not be hindered and to ensure safety.

As seen in FIGS. 5 and 6, upon completion of the assembly as described above, the cage member 52 is free to swing about the bearing member 50 by virtue of the bearing engagement between the first and second bearing surface portions 56 and 60. Since the bearing half-members 72 are brought fully into engagement with one another into a generally spherical configuration upon assembly of the bearing member 50, and since the cage half-members 90 are brought fully into engagement with one another into a closed-loop configuration upon assembly of the cage member 52, proper bearing engagement between the complementary bearing surface portions 56 and 60 is assured. The materials of the bearing member 50 and the cage member 52 are selected for resistance to the elements encountered in marine use, as well as for strength and bearing qualities. Preferably, the bearing member 50 and the cage member 52 are constructed of a molded synthetic polymeric material having appropriate lubricity and high strength, such as nylon. Sleeve 80 is constructed of an elastomer, such as Neoprene, and the threaded fasteners and pins, as well as the swivel-snap, preferably are made of stainless steel.

The stays of various sailboats vary not only in diameter, but in the angle of inclination between any particular stay and the mast of the sailboat. In addition, when a sailboat is underway, the inclination of each stay, relative to the horizon, will vary as the sailboat heels. However, a large pennant, such as pennant 36, always will tend to swing about an altitudinal axis; that is, an axis which extends altitudinally, normal to the horizon. Mounting unit 40 enables free swinging movement of pennant 36 about the altitudinal axis over a range of angles of inclination of stay 30, whether such variation in inclination is due to the given angle of inclination relative to the mast or variations in inclination when the sailboat is underway. Referring now to FIG. 7, the angle of inclination of stay 30 is illustrated as the angle A between the longitudinal axis L of the stay 30 and the altitudinal axis P about which the pennant 36 swings. The spherical surface contour of the bearing surface portions 56 and 60 is represented by the circle C, while the elevated fixed altitudinal position is shown at 42. The first bearing surface portion 56 extends essentially all along the external surface 54 of the bearing member 50 and essentially is fully spherical. The second bearing surface portion 60 is truncated relative to the extent of the first bearing surface portion 56 so as to permit variations in angle A while still enabling free swinging movement of cage member 52 about altitudinal axis P. The internal surface 58 of the cage member 52 extends along an opening 100 passing altitudinally through the cage member 52 and the opening 100 extends beyond the truncated second bearing surface portion 60 in directions transverse to the altitudinal direction to provide a clearance 102 between the cage member 52 and the stay 30 throughout the range of angles A to be accommodated by the mounting unit 40. In this manner, the angle of inclination A can vary over a range of angles without disturbing the ability of the cage member 52, and the pennant 36 carried by the cage member 52, to swing freely about the altitudinal axis P. The angle of inclination of a stay relative to the mast of a sailboat usually varies among sailboats between a stay which runs generally parallel to the mast (zero degrees) and a stay which makes an angle of about forty-five degrees with the mast. Accordingly, the truncation of the second bearing surface portion 60 and the clearance 102 are such that the mounting unit 40 accommodates a range in angle of inclination A of within about forty-five degrees of the altitudinal axis P. Such a range has been found adequate to accommodate most stays found in most sailboats, even when underway. Thus, a single configuration of mounting unit 40 is available for a wide range of use. Opening 100 preferably is in the form of a closed loop 104 extending completely around the bearing member 50, the closed loop 104 being established by the generally C-shaped configuration of the half-members 90 of cage member 52. The closed-loop configuration of cage member 52 provides the requisite strength and durability for flying the relatively large pennant 36.

As explained above, the sleeve 80 accommodates the various stay diameters encountered in sailboats of the type which will fly pennant 36. In the embodiment of sleeve 80 illustrated in FIGS. 3 through 6, and amplified in FIG. 8, the sleeve 80 is split by a slit 110 at 82. Slit 110 extends along the sleeve 80 in longitudinal and circumferential directions such that regardless of the diameter of the stay upon which the sleeve 80 is placed, every plane within which the longitudinal axis L of the stay lies, as illustrated by the trace LP of one such plane, is intercepted by the material of the sleeve 80. Thus, even though the gap at the slit 110 in the material of sleeve 80 may change in a particular installation due to radial expansion or contraction of the sleeve 80 to accommodate the diameter of the particular stay in that installation, as illustrated in phantom in FIG. 8, the material of the sleeve 80 always will be wrapped around the stay to accurately locate the bearing member 50 relative to the longitudinal axis of the stay and provide a fast grip between the bearing member 50 and the stay. In addition, the wrapped configuration of the sleeve 80 assures that the sleeve 80 will not fall inadvertently from the stay during the installation procedure, but will tend to grip the stay frictionally while the bearing member 50 is assembled about the sleeve 80 and the stay. The above relationship is accomplished by slit 110 which follows a generally helical path along the length of the sleeve 80.

An alternate embodiment for an interposed sleeve is illustrated in FIGS. 9 through 12 in which a sleeve 120 is split by a slit 122 having axial legs 124 and circumferential legs 126 for enabling radial expansion and contraction of the sleeve 120 to accommodate any one of a range of predetermined diameters of the stay upon which the mounting unit 40 is to be secured. The legs 124 and 126 of the slit 122 establish a tongue 130 and groove 132 configuration, with the tongue 130 interengaging the groove 132 to assure that every plane within which the longitudinal axis L of the stay lies, illustrated by the trace LP of one such plane, is intercepted by the material of the sleeve 120 as the sleeve 120 is expanded or contracted radially to accommodate the various stay diameters. Thus, in the expanded condition of sleeve 120, illustrated in FIGS. 9 through 11, a larger diameter stay is accommodated, while in the contracted condition illustrated in FIG. 12, a smaller diameter stay is accommodated, all while enabling sleeve 120 to be wrapped around the stay at the elevated altitudinal position 42.

It will be seen that the mounting unit 40 is simple in construction and effective in enabling the mounting of a relatively large pennant flown from any one of a variety of sailboats. As such, the mounting unit attains the several objects and advantages outlined above; namely, permits the mounting of a relatively large pennant upon a selected stay of a sailboat for appropriate free swinging movement of the pennant relative to the stay; accommodates a stay which extends at any one of a range of angles of inclination found in the stays of a wide variety of sailboats and automatically compensates for the particular angle of inclination of the stay upon which a pennant is mounted; is adaptable readily to any one of a plurality of stay sizes encountered in a wide variety of sailboats; enables ease of installation upon a selected stay without requiring special skills or special tools, and without requiring dismantling any connection between the stay and the sailboat; employs a simplified construction for economy of manufacture, ease of installation and minimal maintenance; provides a pennant mount of high strength and durability, suitable for use in connection with a relatively large pennant under virtually all conditions encountered during use; and employs a rugged construction, resistant to the various elements encountered in marine use, for exemplary performance over a long service life.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A pennant mounting unit for mounting a pennant to a stay of a sailboat for free swinging movement relative to the stay about an altitudinal axis passing through an elevated fixed altitudinal position on the stay, the stay extending along a longitudinal axis, the mounting unit comprising:

a bearing member having a longitudinal internal passage and an external surface including a first bearing surface portion following a generally spherical contour of predetermined extent, the bearing member being split longitudinally for reception of the stay in the internal passage by movement laterally into the internal passage such that the stay may be placed longitudinally coextensive with the internal passage at the fixed altitudinal position;

securing means for securing the bearing member at the elevated fixed altitudinal position on the stay;

a cage member having an internal surface including a second bearing surface portion generally complementary to the first bearing surface portion along the spherical contour for bearing engagement between the complementary first and second bearing surface portions, the cage member being split longitudinally for placement laterally over the stay and the bearing member, with the first and second bearing surface portions engaged in said bearing engagement for swinging movement of the cage member relative to the bearing member, when the bearing member is secured to the stay; and attachment means for attaching the pennant to the cage member;

the second bearing surface portion being truncated relative to the predetermined extent of the spherical contour of the first bearing surface portion for enabling orientation of the longitudinal axis, and the stay, at an angle to the altitudinal axis while permitting free swinging movement of the cage member, and the pennant attached thereto, about the altitudinal axis, relative to the stay.

2. The invention of claim 1 wherein the longitudinal axis passes through the elevated fixed altitudinal position.

3. The invention of claim 2 wherein the angle lies within a range of angles common to sailboat stays.

4. The invention of claim 2 wherein the cage member includes an opening passing altitudinally through the cage member, the internal surface of the cage member extending along the opening, the opening extending beyond the truncated second bearing surface portion so as to provide clearance between the cage member and the stay throughout the range of angles between the longitudinal axis and the altitudinal axis.

5. The invention of claim 4 wherein the range of angles is within about forty-five degrees of the altitudinal axis.

6. The invention of claim 1 wherein the stay has a predetermined diameter at the fixed altitudinal position, the longitudinal passage of the bearing member has a lateral diameter greater than the predetermined diameter of the stay, and the securing means includes a sleeve of resilient material having a wall thickness no less than one-half the difference between the predetermined diameter of the stay and the lateral diameter of the passage in the bearing member, the sleeve being split to receive the stay laterally within the sleeve and enable placement of the sleeve around the stay at the fixed altitudinal position such that the bearing member is secured to the stay at the fixed altitudinal position with the sleeve interposed between the stay and the bearing member.

7. The invention of claim 6 wherein the sleeve is unitary and includes a slit passing through the sleeve in a lateral direction, the slit extending along the sleeve in longitudinal and circumferential directions such that every plane within which the longitudinal axis of the stay lies is intercepted by the material of the sleeve.

8. The invention of claim 7 wherein the slit follows a generally helical path along the sleeve for enabling radial expansion and contraction of the sleeve to accommodate any one of a range of predetermined diameters of the stay while assuring that every plane within which the longitudinal axis of the stay lies is intercepted by the material of the sleeve.

9. The invention of claim 7 wherein the slit includes axial legs and circumferential legs establishing interengaged circumferential tongue and groove portions for enabling radial expansion and contraction of the sleeve to accommodate any one of a range of predetermined diameters of the stay while assuring that every plane within which the longitudinal axis of the stay lies is intercepted by the material of the sleeve.

10. The invention of claim 1 wherein the bearing member includes two individual half-members capable of being secured together by the securing means into an integral assembly about the stay with the stay clamped between the half-members.

11. The invention of claim 10 wherein the bearing member has a generally spherical configuration and the individual half-members each have a generally hemispherical configuration.

12. The invention of claim 1 wherein the cage includes two individual half-members and fastening means for fastening the half-members together into an integral assembly about the bearing member with the first and second bearing surface portions engaged in said bearing engagement for swinging movement of the cage member relative to the bearing member.

13. The invention of claim 12 wherein the cage member includes an opening passing altitudinally through the cage member, the internal surface of the cage member extending along the opening, the opening extending beyond the truncated second bearing surface portion so as to provide clearance between the cage member and the stay throughout the range of angles between the longitudinal axis and the altitudinal axis, and the individual half-members each have a generally C-shaped configuration.

14. The invention of claim 1 wherein the securing means includes a set screw threaded through the bearing member from the external surface into the internal passage thereof.

* * * * *